(12) United States Patent
Pebay-Peyroula et al.

(10) Patent No.: US 10,305,682 B2
(45) Date of Patent: May 28, 2019

(54) ENCRYPTION METHOD FOR AN INSTRUCTIONS STREAM AND EXECUTION OF AN INSTRUCTIONS STREAM THUS ENCRYPTED

(71) Applicant: COMMISSARIAT A L'ENERGIE ATOMIQUE ET AUX ENERGIES ALTERNATIVES, Paris (FR)

(72) Inventors: Florian Pebay-Peyroula, Saint-Nizier-du-Moucherotte (FR); Olivier Savry, Sassenage (FR); Thomas Hiscock, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 140 days.

(21) Appl. No.: 15/412,252

(22) Filed: Jan. 23, 2017

(65) Prior Publication Data
US 2017/0214523 A1    Jul. 27, 2017

(30) Foreign Application Priority Data
Jan. 26, 2016    (FR) .................................. 16 50606

(51) Int. Cl.
*G06F 21/00* (2013.01)
*H04L 9/06* (2006.01)
(Continued)

(52) U.S. Cl.
CPC ............ *H04L 9/0662* (2013.01); *G06F 21/10* (2013.01); *G06F 21/60* (2013.01); *H04L 9/06* (2013.01); *H04L 9/0668* (2013.01)

(58) Field of Classification Search
CPC ...... G06F 21/60; G06F 21/602; G06F 21/604; G06F 21/10; G06F 21/12; G06F 21/121;
(Continued)

(56) References Cited

U.S. PATENT DOCUMENTS

| 4,562,305 A | 12/1985 | Gaffney, Jr. |
| 6,345,359 B1 | 2/2002 | Bianco |
| 2010/0153745 A1* | 6/2010 | Onno ................... G06F 21/125 713/190 |

FOREIGN PATENT DOCUMENTS

FR    1359473    4/1964

OTHER PUBLICATIONS

French Preliminary Search Report dated Oct. 31, 2016 in French Application 16 50606 filed on Jan. 26, 2016 (with English Translation of Categories of Cited Documents).
(Continued)

*Primary Examiner* — Edward Zee
(74) *Attorney, Agent, or Firm* — Oblon, McClelland, Maier & Neustadt, L.L.P.

(57) ABSTRACT

A method of encrypting a program instructions stream and a method of executing an instructions stream thus encrypted. Instructions are translated into binary code before being encrypted by a stream cipher method. When the program contains a conditional or unconditional branch instruction, an instruction is inserted in the program to initialize the pseudo-random sequence generator using an initialization vector, the initialization vector being used to generate the pseudo-random sequence for encryption and decryption of instructions at the branch address. Instructions can be decrypted and executed on-the-fly without needing to know their physical addresses, even in the presence of a branch.

11 Claims, 8 Drawing Sheets

(51) Int. Cl.
*G06F 21/60* (2013.01)
*G06F 21/10* (2013.01)

(58) Field of Classification Search
CPC ......... G06F 21/14; H04L 9/06; H04L 9/0656;
H04L 9/0662; H04L 9/0668
See application file for complete search history.

(56) References Cited

OTHER PUBLICATIONS

Sungkyu Cho, et al., "Secure and Efficient Code Encryption Scheme Based on Indexed Table", ETRI Journal, vol. 33, (1), 2011, 11 pgs.
Yun Tian, et al., "On the Design of Trivium", 2009, 13 pgs.

\* cited by examiner

ENCRYPTION METHOD FOR AN INSTRUCTIONS STREAM AND EXECUTION OF AN INSTRUCTIONS STREAM THUS ENCRYPTED

TECHNICAL DOMAIN

The purpose of this invention relates to the domain of software encryption and execution of software thus encrypted.

STATE OF PRIOR ART

Increasing security needs, particularly in virtualisation contexts, make it necessary to envisage encryption of software before it is executed by a real or virtual machine.

Instructions to be executed by a microcontroller can be encrypted in different ways:

In a first "offline" type of implementation, the software is fully encrypted in advanced and is sent to the microcontroller. The microcontroller or dedicated processor decrypts the software and then stores it, unencrypted, in a mass memory. The microcontroller then executes the unencrypted software, read from this memory.

In a second type of "boot" implementation, the software is stored in encrypted form in a mass memory, for example a flash memory. The microcontroller decrypts the software during the boot procedure and stores it unencrypted in a RAM. The microcontroller then executes the unencrypted instructions read from the RAM.

In a third "on-the-fly" type of implementation, the software is encrypted by block, each block being sent to the microcontroller. The microcontroller decrypts the received block, on-the-fly, and stores it in a cache memory before executing it. However, it is difficult to adopt this type of implementation when a block contains a conditional jump instruction to an instruction that does not belong to the same block, due to the loss of the encryption context.

Document U.S. Pat. No. 6,345,359 describes a method of encryption for a stream of instructions using a one-time mask. Encryption is done instruction by instruction, the mask being generated from an encryption key and the address at which the instruction is stored. Therefore the mask is discarded at each new instruction.

Encryption is done on-the-fly, instruction by instruction starting from the encryption key and the address at which the instruction is stored. The fact that encryption is done instruction by instruction using the storage address enables the microcontroller to synchronise its key, including at the time of a jump during execution of the program.

However, this method of software encryption and on-the-fly execution assumes that the physical address of each instruction is known, both during encryption and decryption. In particular, it will be impossible to execute the software if it was copied to a different memory location or simply if it was loaded in a buffer memory. In other words, encryption of the software must be repeated every time that the software is installed or copied. Nor will it be possible to execute the stream of instructions thus encrypted by a virtual machine.

Consequently, the purpose of this invention is to propose a method of encrypting a stream of instructions that will make on-the-fly execution possible, instruction by instruction, without it being necessary to know the physical addresses of these instructions. Another purpose of this invention is to disclose a method of executing a stream of instructions encrypted by such an encryption method.

PRESENTATION OF THE INVENTION

This invention is defined by a method of encryption of a program instructions stream using a stream cipher with a pseudo-random sequence generator configured by a secret key (K) and initialised by an initialisation vector (IV), in which:
- the instructions stream is translated into binary code by a compiler, said binary code being added bit by bit to the pseudo-random sequence to provide an encrypted instructions stream;
- when the program comprises a branch instruction to a branch address, a corresponding initialisation instruction is inserted in the program to initialise the pseudo-random generator with an initialisation vector specific to the branch address, the instructions from the branch address being encrypted using a pseudo-random sequence generated by the pseudo-random generator initialised by said specific initialisation vector.

According to a first embodiment, the initialisation instruction is inserted just before the branch instruction.

Advantageously, the initialisation instruction is inserted unencrypted in the encrypted instructions stream.

Alternatively, the initialisation instruction is encrypted with said pseudo-random sequence before being inserted.

In a second embodiment, the initialisation instruction is inserted unencrypted at the branch address in the encrypted instructions stream.

The invention also relates to a method of executing an instructions stream in a program, encrypted using the encryption method described above, in which:
- a pseudo-random sequence is generated using the pseudo-random sequence generator configured by said secret key and initialised by said initialisation vector;
- the encrypted instructions stream is added bit by bit to the pseudo random sequence, each encrypted instruction being decrypted and executed before going onto the next instruction;
- each initialisation instruction is detected in the encrypted instructions stream and, when such an initialisation instruction is detected, the initialisation vector contained in it is extracted and the pseudo-random sequence generator is initialised with the initialisation vector thus extracted in the case of a branch to the branch address.

An initialisation instruction is detected, possibly after decryption, by means of a specific prefix.

If an initialisation instruction is inserted before a branch instruction to a branch address, the initialisation vector extracted from the extracted initialisation instruction is stored in an intermediate register when it is detected and the pseudo-random generator is initialised with the content of said register when jumping to the branch address.

According to a first example application, the program comprises at least one conditional branch instruction. According to a second example application, the program comprises at least one unconditional branch instruction.

BRIEF DESCRIPTION OF THE DRAWINGS

Other characteristics and advantages of the invention will become clear after reading a preferred embodiment of the invention with reference to the appended figures among which.

DETAILED PRESENTATION OF PARTICULAR EMBODIMENTS

In the following description, we will consider a stream of instructions that can be executed by a processor (CPU or microcontroller). This instructions stream is in the form of a binary file generated using a compiler from a source program in an assembly language or higher level language. Each instruction is represented by a binary code that respects an instruction format and has a fixed size. An instruction is usually defined by an operation to be done (for example logical and arithmetic operation) and if applicable, a source operand and a destination operand. Operands may be defined by internal registers or memory locations.

Normally, the processor executes the instructions sequentially, the instruction pointer supplying the address of the next instruction to be executed simply being incremented by the size of the instruction. The instructions are read by the sequencer at the address supplied by the instruction pointer and presented to the arithmetic and logical unit (ALU) of the processor that interprets them.

However, the sequential rule is not followed in the presence of control instructions (conditional or unconditional jump, loop, etc.), the address present in the instruction pointer then being modified by the control instruction A first basic concept of the invention is to use a (stream cipher) to encrypt the instructions stream, the instructions being in the form of binary code.

Note that the stream cipher is based on the principle of the Vernam code or one-time mask. Each bit is individually encrypted by bit by bit addition (XOR operation) of the plain text message with the mask in question. In practice, stream cipher methods generate the pseudo-random sequence starting from a linear or non-linear combination of offset register outputs, looped back onto and/or between themselves. The generated pseudo-random sequence, also called the (keystream) forms the one-time mask.

Most recent stream cipher methods use firstly a secret key as in any symmetric cryptosystem, denoted K, and an initialisation vector IV, using a new value in each encryption session, also called a nonce (number used once) (special value for the occasion). Unlike the encryption key, the initialisation vector is public. It is essentially to randomise the keystream between one encryption session and the next.

Figure 1A:
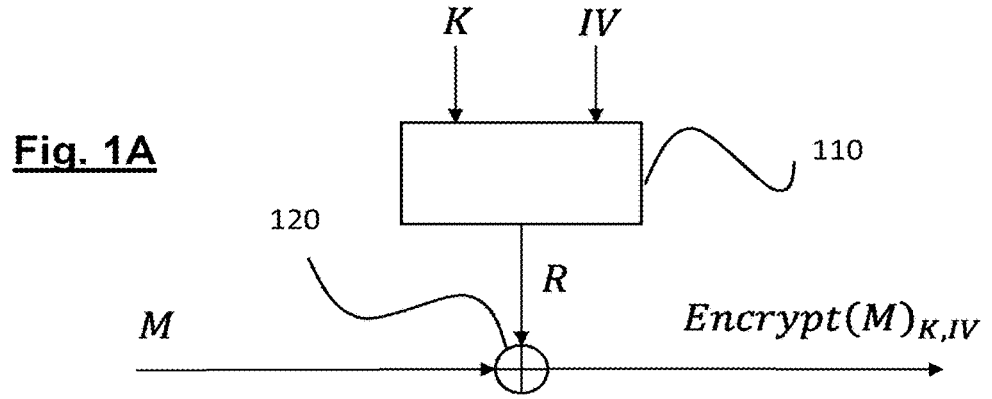
FIGS. 1A and 1B diagrammatically represent the principle of a stream cipher and decipher method.

FIG. 1A diagrammatically represents the principle of a stream cipher method.

The unencrypted binary stream (for example composed of the binary program file, in other words binary codes of successive instructions of this program), is represented by M. A pseudo-random generator, 110, receives the secret key, K and the initialisation vector, IV and outputs the pseudo-random sequence, R. This is added bit by bit at 120 (XOR) to the unencrypted binary stream. The stream thus encrypted is denoted $\text{Encrypt}(M)_{K,IV} = M \oplus R$.

Figure 1B:
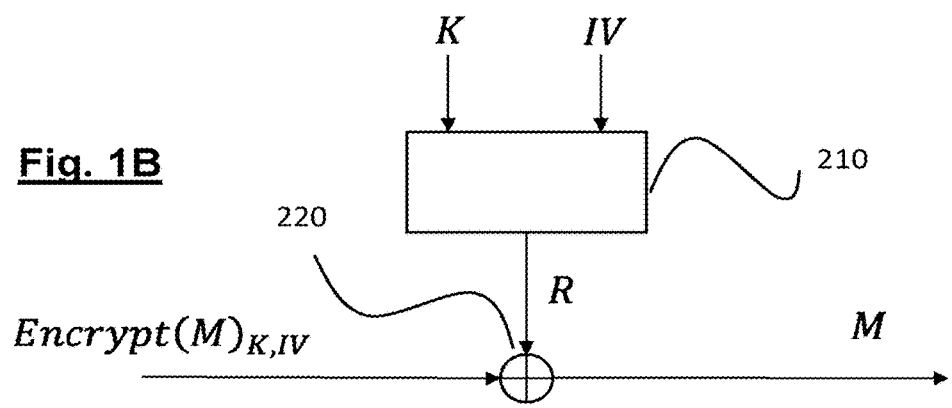

Similarly, FIG. 1B represents the decryption principle of a binary stream encrypted using the stream cipher method shown in FIG. 1A.

Decryption uses a pseudo-random sequence generator 210, identical to that used for encryption, 110. The pseudo-random sequence generator 210 receives the same encryption key, K and is initialised by the same initialisation vector IV. The encrypted binary stream is summated bit by bit in 220 with the pseudo-random sequence R to restore the binary stream in unencrypted form.

An example of the stream cipher method is Trivium, for which a description can be found in the paper by Y. Tian et al. entitled «On the design of Trivium», published in IACR Cryptology ePrint Archive, 2009. Alternatively, other stream cipher methods can be used, such as the Grain and Mickey methods, or even the older RC4 algorithm.

Figure 2:
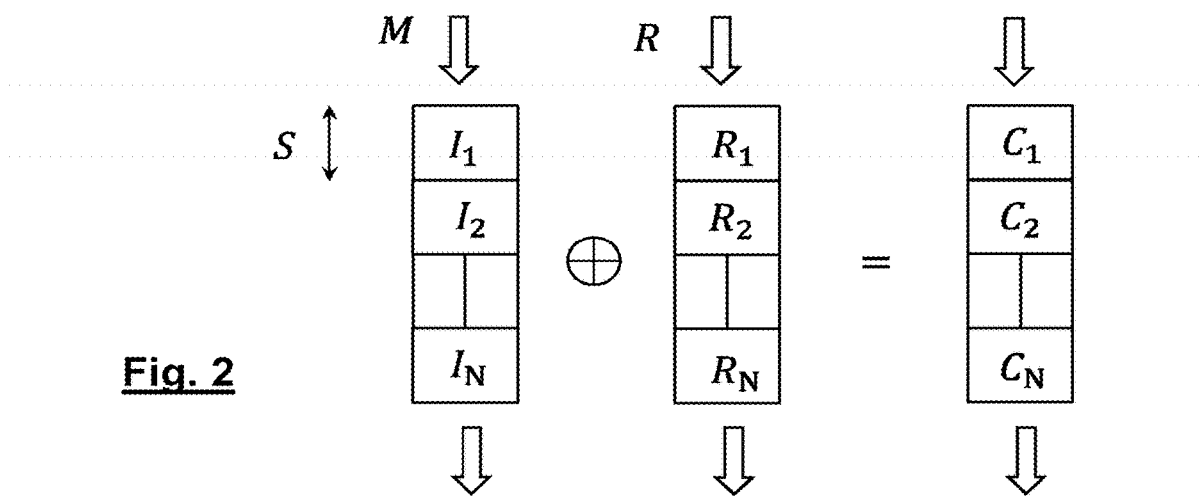
FIG. 2 represents an example application of a stream cipher method for a sequence of instructions.

FIG. 2 represents an example of a stream cipher for encryption of an instructions sequence;

The instructions in the form of binary code are denoted herein $I_1, \ldots, I_N$ and their size is S. The binary stream to be encrypted is composed of the sequence $M = I_1, \ldots, I_N$. The output sequence from the pseudo-random generator is broken down into successive words with size S, $R_1, \ldots, R_N$, in other words the encrypted binary stream is nothing other than the series of encrypted instructions $C_i = R_i \oplus I_i$, $i = 1, \ldots, N$. Successive words $R_1, \ldots, R_N$ are obtained during a given encryption session, in other words for the same initialisation vector.

Symmetrically, the same pseudo-random sequence is generated during decryption, from the key K and the initialisation vector IV and is broken down into successive words $R_1, \ldots, R_N$. These words are summated, bit by bit, with the encrypted instructions $C_1, \ldots, C_N$ to once again obtain the unencrypted instructions $I_1, \ldots, I_N$.

As mentioned in the introduction part, the instruction pointer can reach a control instruction during execution of a program, for example an unconditional jump instruction (also called an unconditional branch) or an conditional jump instruction (also called a conditional branch. Such a situation is illustrated in the example in FIG. 3. The program comprises a first instruction block (represented in assembly language to improve visibility), $BB_0$ of which the last instructions are BNE $r_1, r_3, @BB_1$ and JMP $@BB_2$. In other words, if the contents of the registers $r_1$ and $r_3$ are different, the instruction jumps to the address $@BB_1$ of a second block, $BB_1$, and by default jumps to the address $@BB_2$ of a third block $BB_2$. It can be understood that blocks $BB_1$ and $BB_2$ do not respect continuity of the sequence and therefore cannot be decrypted as such.

The second concept on which the invention is based consists of inserting a specific instruction just before the branch instruction or at the branch address when the instructions stream is encrypted, with an initialisation vector as argument and informing the pseudo-random sequence generator that the initialisation vector in question should be loaded.

It should be noted that iterative loops are considered as a repetition of a sequence of instructions with a conditional jump. Consequently they can also use the encryption method according to the present invention.

Figure 3:
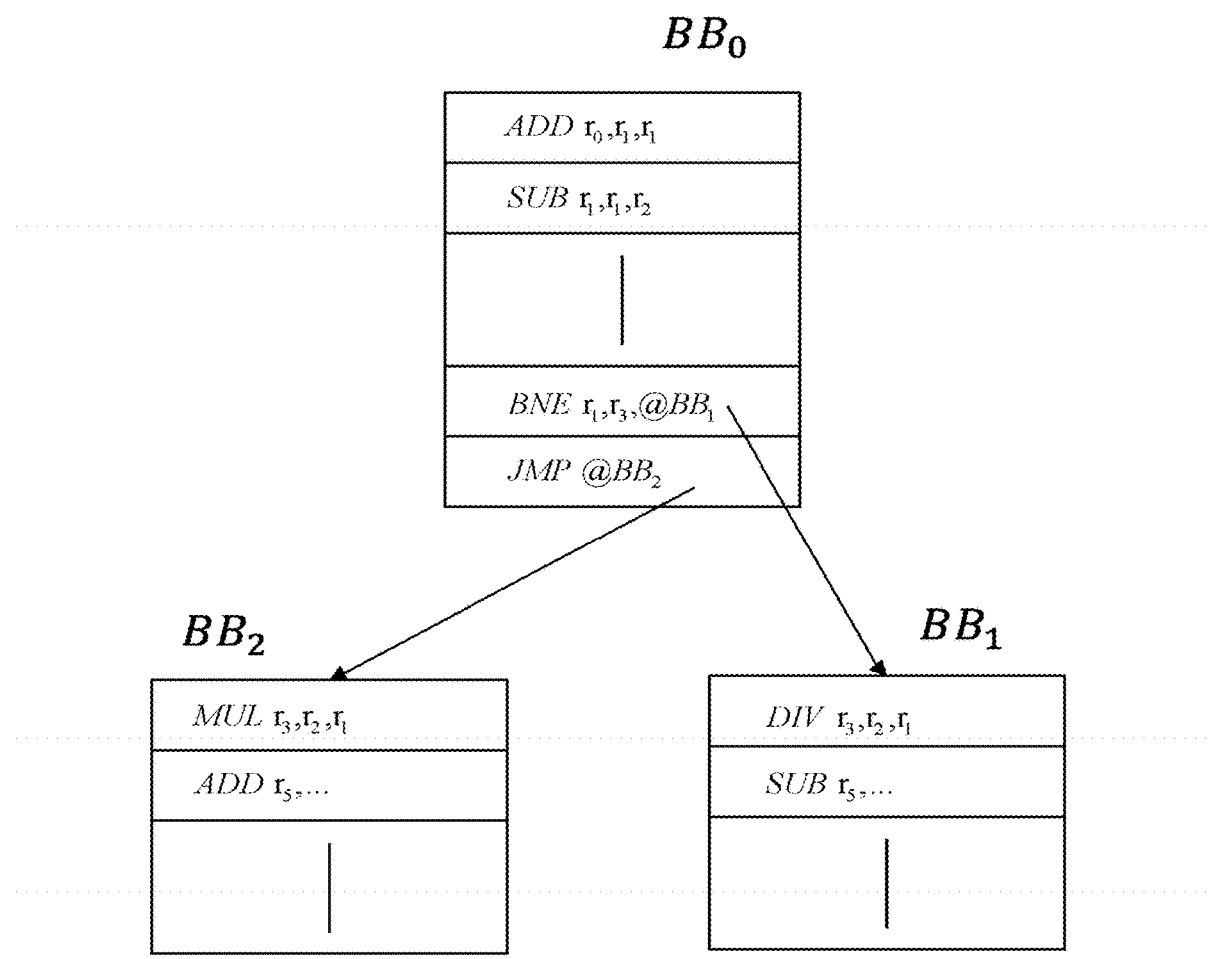
FIG. 3 represents an example of an instruction sequence comprising a conditional branch instruction and an unconditional branch instruction.
Figure 4A:
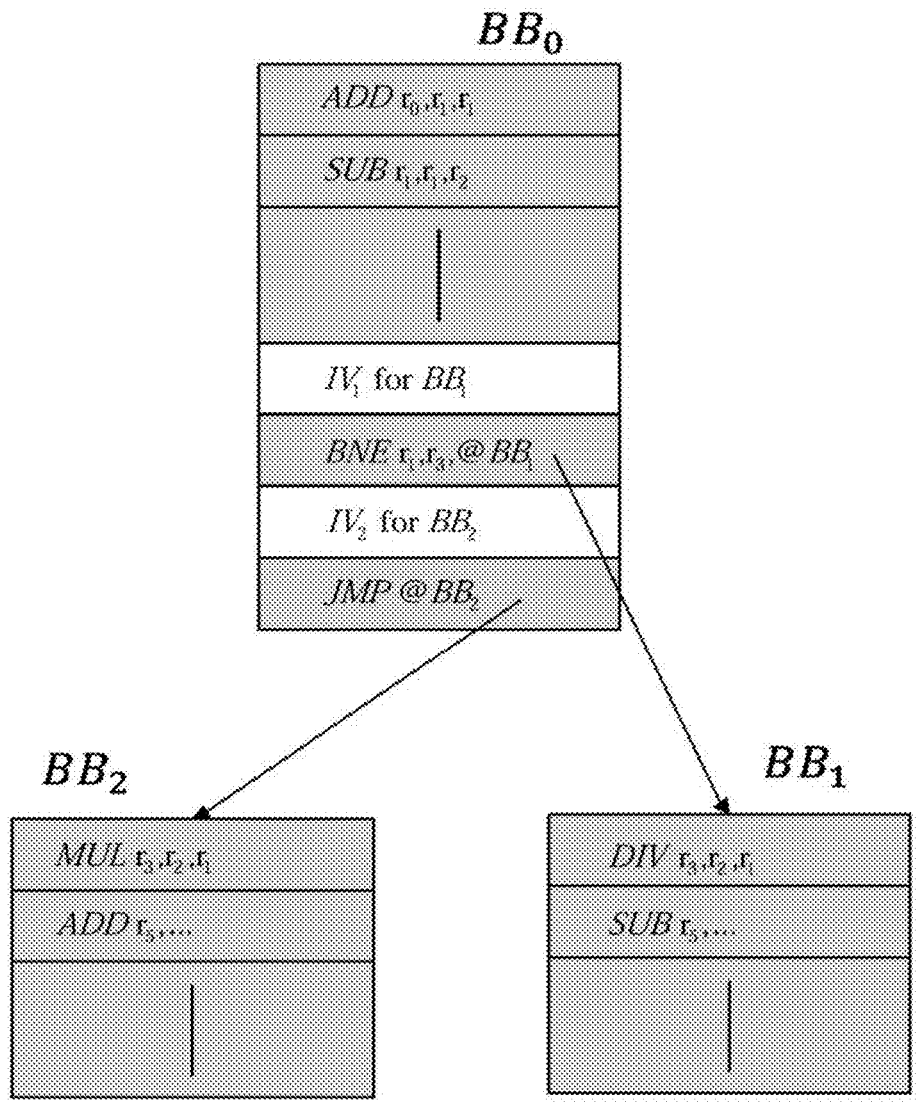
FIG. 4A represents the instruction sequence in FIG. 3, encrypted using an encryption method according to a first embodiment of the invention.

FIG. 4A represents the instruction sequence in FIG. 3, encrypted using an encryption method according to a first embodiment of the invention.

According to this embodiment, the specific instruction to load the initialisation vector is inserted just before the branch instruction.

Instructions encrypted using the stream encryption method are shown in grey. An initialisation instruction $IV_1$ for $BB_1$ was inserted just before the conditional branch instruction BNE $r_1, r_3, @BB_1$, this instruction indicating that the initialisation vector $IV_1$ has to be loaded in the pseudo-random sequence generator for on-the-fly decryption and execution of block $BB_1$, if the conditions of the conditional branch are satisfied. Similarly, an initialisation instruction $IV_2$ for $BB_2$ was inserted just before the unconditional branch instruction JMP $@BB_2$. The inserted instruction indicates that the initialisation vector $IV_2$ needs to be loaded in the pseudo-random sequence generator for on-the-fly decryption and execution of the bloc $BB_2$.

The $IV_1$ for $BB_1$ and $IV_2$ for $BB_2$ instructions can be encrypted like the remainder of the block $BB_0$ (using the stream cipher method, with the key K and the initialisation vector $IV_0$). Alternatively, the initialisation instructions can appear unencrypted in the block as shown in FIG. 4A. In the first case, the initialisation instruction must firstly be decrypted before the pseudo-random sequence generator is reinitialised, and in the second case the unencrypted instruction includes a control prefix indicating that it must not be decrypted but should be used directly to control the pseudo-random generator.

Figure 4B:
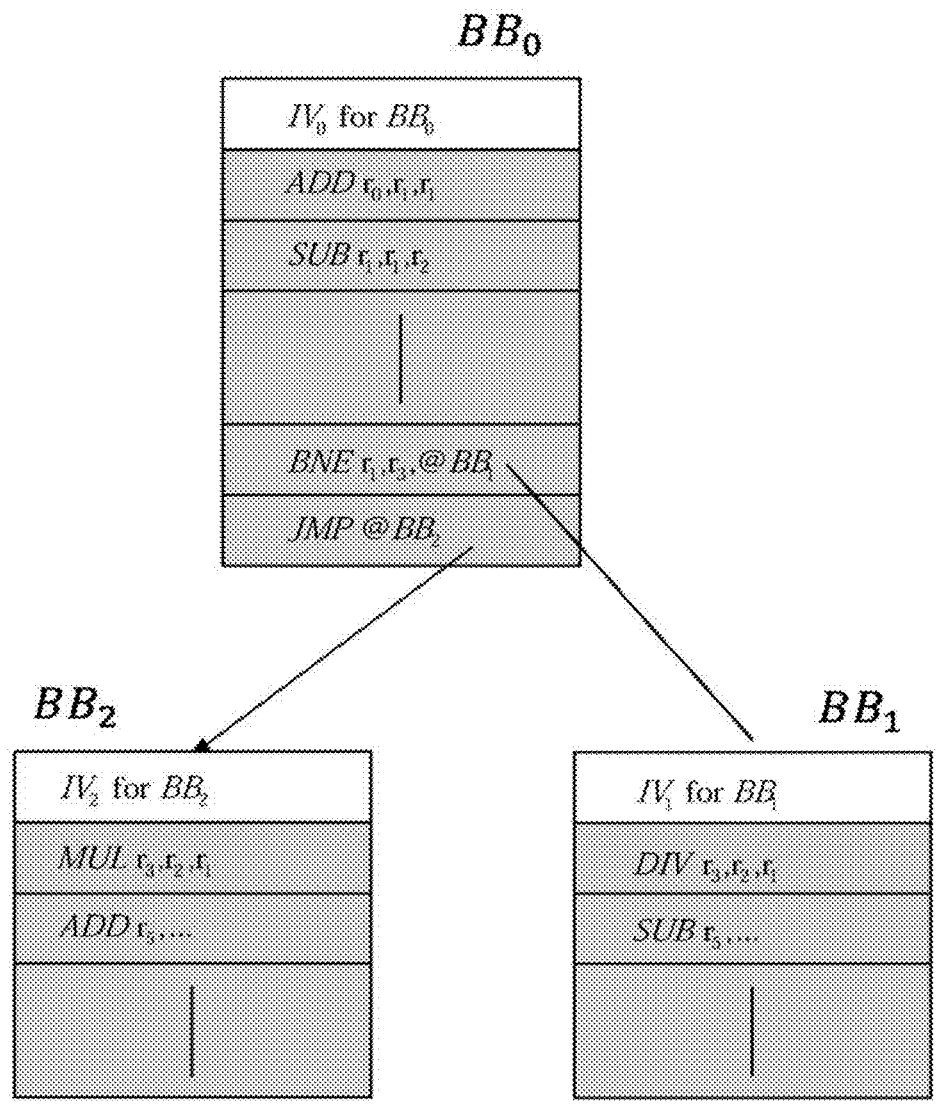
FIG. 4B represents the instruction sequence in FIG. 3, encrypted using an encryption method according to a second embodiment of the invention.

FIG. 4B represent the instruction sequence in FIG. 3, encrypted using an encryption method according to a second embodiment of the invention;

In this second embodiment, there is an initialisation instruction at the top of each instruction block, at the branch address. Thus, the $IV_0$ for $BB_0$, $IV_1$ for $BB_1$ and $IV_2$ for $BB_2$ instructions are placed at the front of instruction blocks $BB_0, BB_1, BB_2$, respectively. These initialisation instructions remain unencrypted in the encrypted binary stream: preferably, they contain a control prefix indicating that they must not be decrypted, and must be used to initialise the pseudo-random sequence generator. Thus, when the instruction pointer reaches the beginning of block $BB_0$, the pseudo-random generator is initialised with the initialisation vector $IV_0$, the instructions in the block are decrypted (using the pseudo-random sequence thus generated) and executed on-the-fly by the processor ALU. Similarly, when the instruction pointer reaches the beginning of block $BB_1$ (when the conditional branch conditions are satisfied) or the beginning of block $BB_2$ (due to the unconditional jump instruction), the pseudo-random sequence generator is (re)initialised with the initialisation vector $IV_1$ or $IV_2$ respectively. It is thus certain that the pseudo-random sequence used for decryption is the same as that used to encrypt the block.

Figure 5:
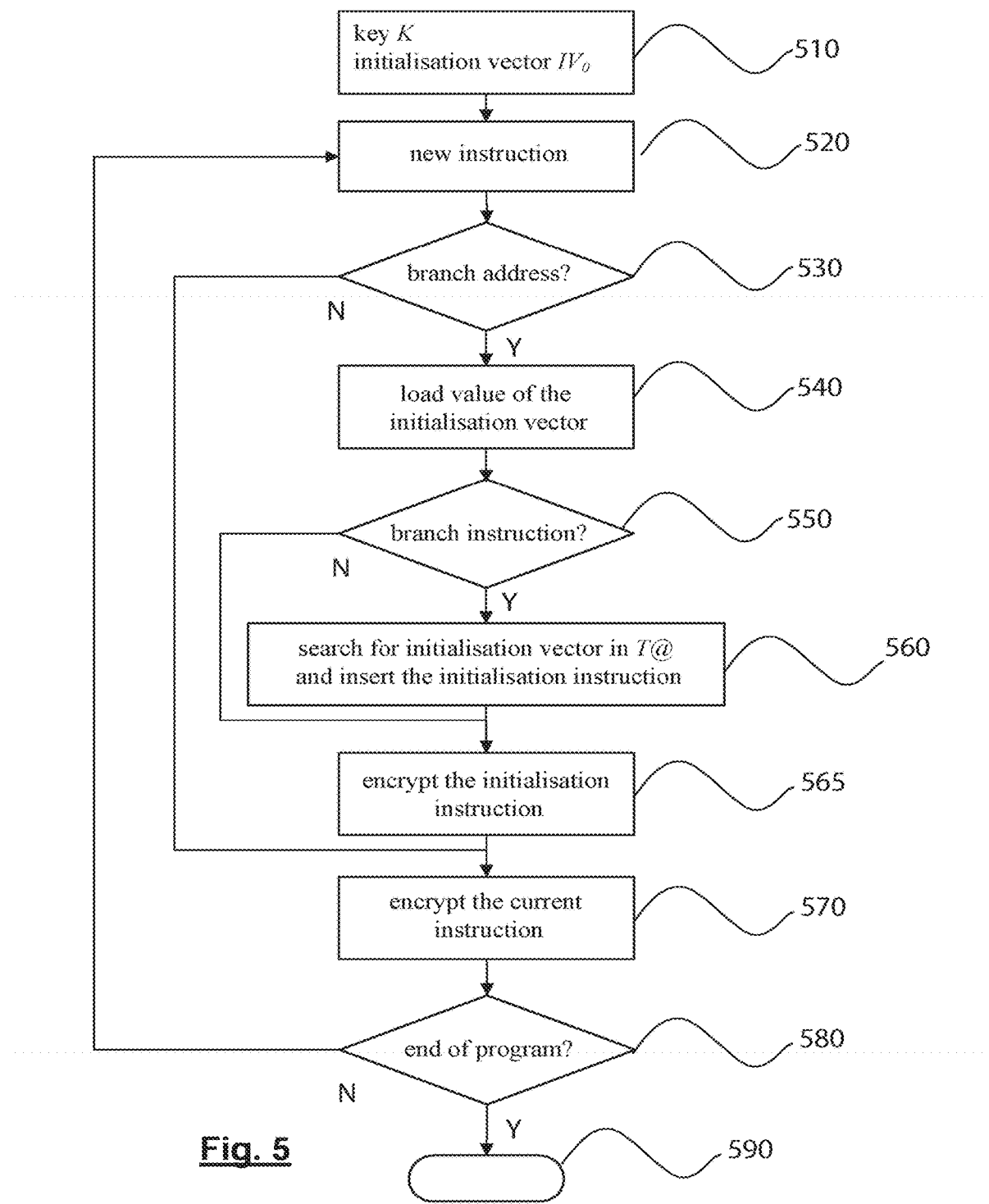
FIG. 5 represents a flowchart of the method of encryption an instructions stream according to the first embodiment of the invention.

FIG. 5 diagrammatically represents a flowchart of the method of encryption of an instructions stream according to the first embodiment of the invention;

This encryption method is carried out by a compiler, by definition capable of translating instructions in assembly language into instructions in machine language (binary code). In particular, the compiler is capable of identifying conditional or unconditional jump instructions in the assembly language program, and branch addresses. Branch addresses are stored in a table T @ and a specific value of the initialisation vector is associated in the table with each branch address. Branch addresses are relative addresses (instruction numbers) and not physical addresses. Initialisation vector values can be determined by a random draw or from the output of a counter, incremented at each new branch address.

The instructions stream in assembly language is supplied, instruction by instruction, to the stream cipher method. This is initialised in 510 by means of an encryption key K and a value $IV_0$ of the initialisation vector of the pseudo-random sequence generator.

A new instruction is accepted in step 520. In step 530, table T @ is used to determine whether or not the current instruction is a branch address If it is, the value of the initialisation vector corresponding to this address is loaded into the pseudo-random sequence generator, in step 540. Otherwise, the process is continued at 570 without modifying the initialisation vector.

In step 550, it is determined if the current instruction is a branch instruction (conditional or unconditional).

If it is not a branch instruction, step 565 is performed directly.

On the other hand, if the current instruction is a branch instruction, a search is made in table T @ in step 560, for the value of the initialisation vector corresponding to the branch address. This value is denoted $IV_i$. The next step is to insert a pseudo-random sequence generator initialisation instruction with value $IV_i$ before the current instruction.

In a first variant in which the initialisation instruction is left unencrypted, the sequence goes directly to step 570. Otherwise, in a second variant described herein, the initialisation instruction is encrypted by the stream cipher in step 565 based on the current value of the initialisation vector.

In step 570, the current instruction is encrypted using the stream cipher algorithm. This is done by firstly having the compiler translate the instruction into binary code and the binary code is then encrypted by the pseudo-random sequence based on the current value of the initialisation vector.

Step 580 determines whether or not the end of the program has been reached. If not, the sequence returns to 520 to process the next current instruction. If the end of the program has been reached, the instructions stream encryption method terminates at 590.

Figure 6:
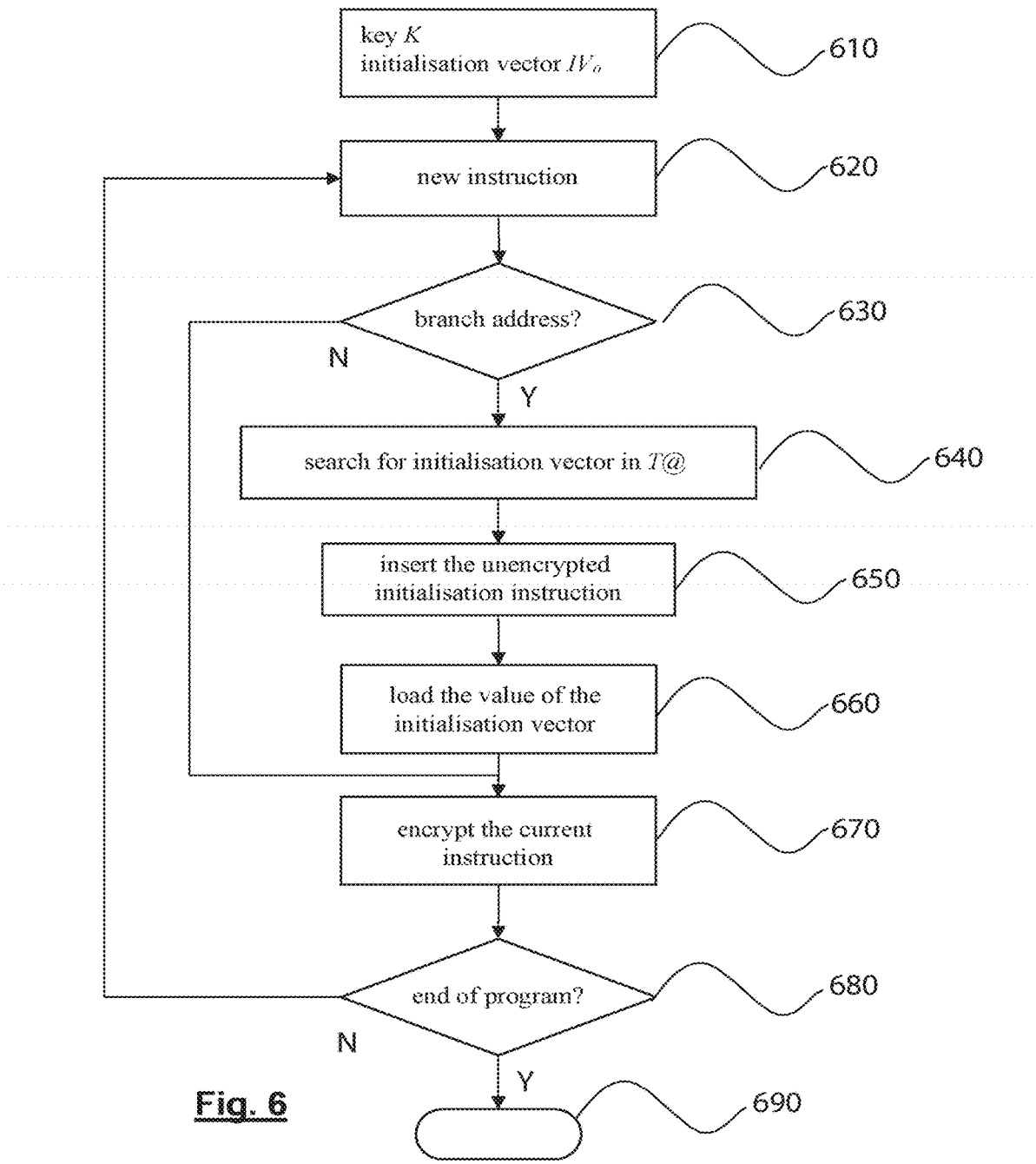
FIG. 6 represents a flowchart of the method of encryption an instructions stream according to the second embodiment of the invention.

FIG. 6 represents a flowchart of the method of encryption an instructions stream according to the second embodiment of the invention.

As in the first embodiment, the encryption method is carried out by a compiler. The compiler knows the branch addresses of the different program blocks. These branch addresses are listed in a table T @. It is assumed that an initialisation vector has been generated corresponding to each branch address and that this initialisation vector is stored in a table related to the corresponding branch address.

The instructions stream in assembly language is supplied, instruction by instruction, to the stream cipher method.

In step 610, the pseudo-random sequence generator is initialised with the cipher key K and with the value $IV_0$ of the initialisation vector associated with the first block.

A new instruction is accepted in step 620.

In step 630, table T @ is used to determine whether or not the current instruction is a branch address If it is not a branch address, step 670 is performed directly.

On the other hand, if the current instruction is a branch address, a search is made in table T@ in step 640, for the initialisation value $IV_i$ corresponding to this branch address.

In 650, an instruction to initialise the pseudo-random sequence generator to value $IV_i$ is inserted unencrypted at the branch address.

In 660, the new value $IV_i$ is used to update the initialisation vector of the pseudo-random sequence generator.

In step 670, the current instruction is encrypted using the stream cipher algorithm. This is done by having the compiler translate the instruction into binary code and the binary code is then encrypted by the pseudo-random sequence of the stream cipher algorithm.

Step 680 determines whether or not the end of the program has been reached. If not, the sequence returns to 620 to process the next current instruction. If the end of the program has been reached, the instructions stream encryption method terminates at 690.

Figure 7:
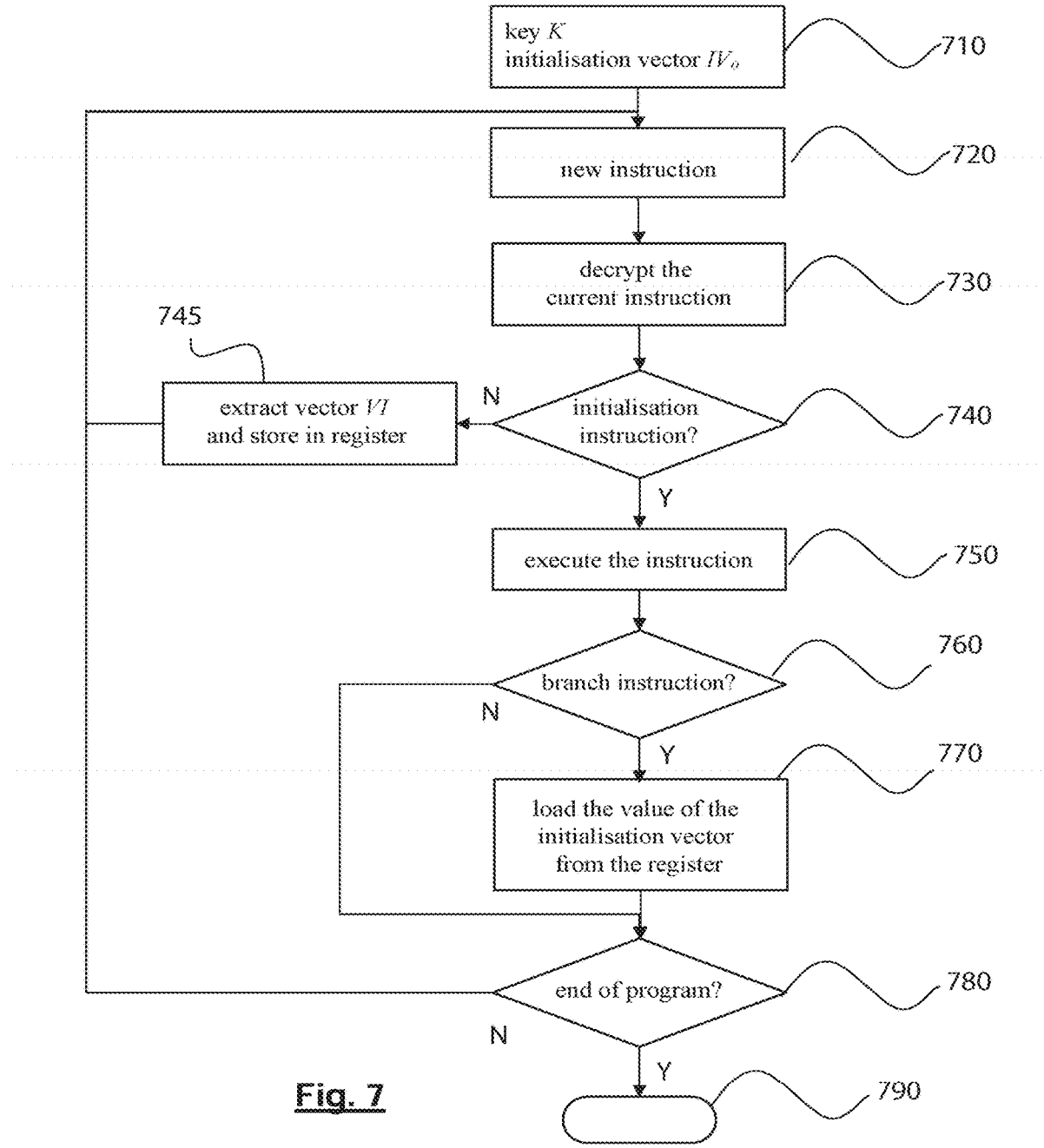
FIG. 7 represents a flowchart of the method of executing an instructions stream encrypted by the encryption method in FIG. 5.

FIG. 7 represents a flowchart of the method of executing an instructions stream encrypted by the encryption method in FIG. 5.

In 710, the pseudo-random sequence generator is initialised with the secret key K that was used for encryption and the initial initialisation vector $IV_0$.

In 720, a search (FETCH operation) is made for a new instruction in the memory.

In 730, the instruction is decrypted using the pseudo-random sequence and in 740 it is determined if the instruction thus decrypted is an instruction to initialise the pseudo-random sequence generator. If it is, the new value of the initialisation vector is extracted and it is stored in a register in step 745, and the sequence then returns to step 720. If it is not, the sequence continues at 750.

Alternatively, it is determined if the instruction is unencrypted (case of the first variant), and if it is, the new value of the initialisation vector is extracted directly and is stored in the register in question before returning to step 720.

In 750, the ALU executes the previously encrypted instruction. In 760, it is checked if the instruction is an unconditional branch instruction or a conditional branch instruction for which the condition is satisfied. If it is, the value of the register is loaded in step 770 as the new initialisation value of the pseudo-random sequence generator. Otherwise, the sequence continues at 780.

In 780, it is checked if an end instruction has been reached. If it has, execution stops at 790. Otherwise, execution continues with a search for a new instruction in step 720.

Figure 8:
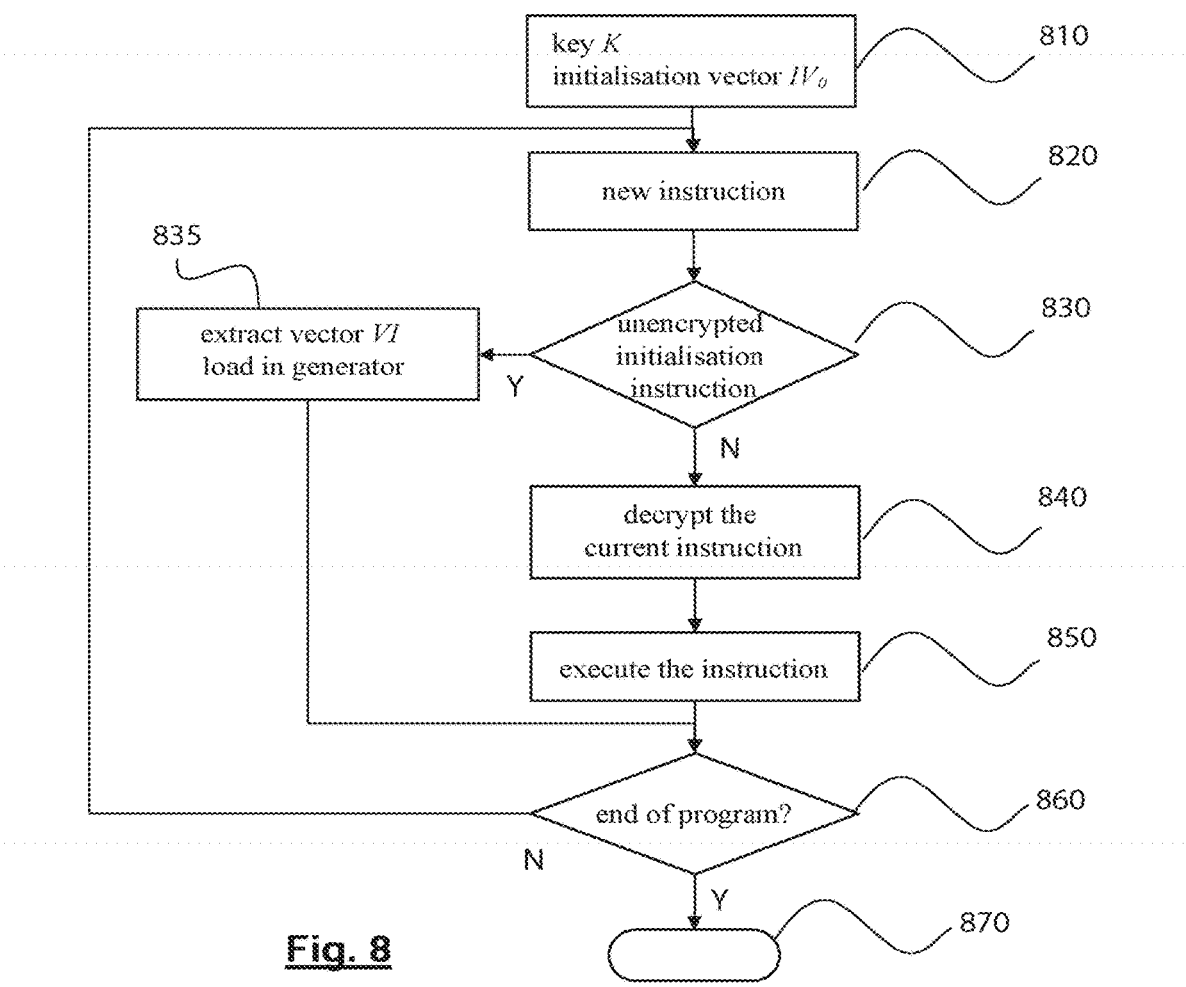
FIG. 8 represents a flowchart of the method of executing an instructions stream encrypted by the encryption method in FIG. 6.

FIG. 8 represents a flowchart of the method of executing an instructions stream encrypted by the encryption method in FIG. 6.

In 810, the pseudo-random sequence generator is initialised with the secret key K that was used for encryption and the initial initialisation vector $IV_0$.

In 820, a search (FETCH operation) is made for a new instruction in the memory.

In step 830, it is determined if an instruction is an (unencrypted) instruction to initialise the pseudo-random sequence generator.

If it is, the new value of the initialisation vector is extracted in step 835, and it is loaded into the pseudo-random sequence generator. The sequence is continued at step 860.

If not, the current instruction is decrypted in 840 using the pseudo-random sequence.

The ALU executes the previously decrypted instruction in step 850.

In 860, it is checked if an end instruction has been reached. If it has, execution stops at 870. Otherwise, execution continues with a search for a new instruction in step 820.

An expert in the subject will understand that regardless of which embodiment is envisaged, a conditional or unconditional branch is associated with a value of the initialisation vector during encryption of the instructions stream. This value is used to initialise the pseudo-random sequence generator for encryption of the instruction block corresponding to the branch address. During execution of the instructions stream, the initialisation vector corresponding to this block is used for its decryption. Thus, there is no need to refer to a physical address during encryption or decryption of a program instruction.

In the above description, it was assumed that the instructions stream to be encrypted is in the form of a binary file generated by a compiler. This compiler is traditionally static, in other words the compiler produces the machine code once and for all before execution, starting from a program in source language and this machine code is stored in the memory of the processor. According to one variant, the compiler may be dynamic, in other words some parts of the code can be generated directly during execution of the program. The parts of the code in question are generated by a dedicated code generator, also called a compilette or polymorphic code generator stored in the ROM of the processor instead of the machine code itself. This compilette is controlled by a randomising source (random or pseudo-random number) and produces different functionally equivalent variants of a software routine or component, called polymorphic instances. The polymorphic instance is not present in memory before the program is executed.

A detailed description of the polymorphic execution of a program is given in application FR-A-13 59473 incorporated herein by reference.

Polymorphic execution of the code can be combined with a stream cipher. In other words, the polymorphic instances can be generated encrypted. For backward branches, in other words branches to previously generated instruction addresses, the encryption method presented with reference to FIGS. 5 and 6 is applicable as before.

Polymorphic execution of the encrypted code has an additional advantage that the static code encryption method presented above does not have. An attacker who knows the encryption code could not decrypt the code directly, he would also have to be able to execute the code before he could decrypt it, which would be particularly difficult due to the polymorphism of the generated code.

The invention claimed is:

1. A method of encryption of a program instructions stream using a stream cipher with a pseudo-random sequence generator configured by a secret key and initialised by an initialisation vector, comprising:

translating the instructions stream into binary code by a compiler, said binary code being summated bit by bit with a pseudo-random sequence generated by the pseudo-random generator to provide an encrypted instructions stream;

inserting, when the program comprises a branch instruction to a branch address, a corresponding initialisation instruction in the program to initialise the pseudo-random generator with a specific initialisation vector specific to the branch address, the instructions from the branch address being encrypted using a pseudo-random sequence generated by the pseudo-random generator initialised by said specific initialisation vector.

2. The method of encryption of an instructions stream according to claim 1, wherein the initialisation instruction is inserted just before the branch instruction.

3. The method of encryption of an instructions stream according to claim 2, wherein the initialisation instruction is inserted unencrypted in the encrypted instructions stream.

4. The method of encryption of an instructions stream according to claim 2, wherein the initialisation instruction is encrypted with said pseudo-random sequence before being inserted.

5. The method of encryption of an instructions stream according to claim 1, wherein the initialisation instruction is inserted unencrypted at the branch address in the encrypted instructions stream.

6. A method of encryption of a program instructions stream using a stream cipher with a pseudo-random sequence generator configured by a secret key and initialised by an initialisation vector, comprising:
- translating the instructions stream into binary code by a compiler, said binary code being summated bit by bit with a pseudo-random sequence generated by the pseudo-random generator to provide an encrypted instructions stream;
- inserting, when the program comprises a branch instruction to a branch address, a corresponding initialisation instruction in the program to initialise the pseudo-random generator with a specific initialisation vector specific to the branch address, the instructions from the branch address being encrypted using a pseudo-random sequence generated by the pseudo-random generator initialised by said specific initialisation vector, wherein:
- the pseudo-random sequence is generated using the pseudo-random sequence generator configured by said secret key and initialised by said initialisation vector;
- the encrypted instructions stream is summated bit by bit with the pseudo random sequence, each encrypted instruction being decrypted and executed before going onto the next instruction;
- each initialisation instruction is detected in the encrypted instructions stream and, when one initialisation instruction is detected, an extracted initialisation vector contained in the one initialization instruction is extracted and the pseudo-random sequence generator is initialised with the extracted initialisation vector in the case of a branch to the branch address.

7. The method of executing an instructions stream according to claim 6, wherein an initialisation instruction is detected by means of a specific prefix.

8. The method of executing an instructions stream according to claim 6, wherein, if an initialisation instruction is inserted before a branch instruction to a branch address, the initialisation vector extracted from the inserted initialisation instruction is stored in an intermediate register when it is detected and the pseudo-random generator is initialised with the content of said register when jumping to the branch address.

9. The method of execution of a instructions stream according to claim 6, wherein the program comprises at least one conditional branch instruction.

10. The method of execution of a instructions stream according to claim 6, wherein the program comprises at least one unconditional branch instruction.

11. The method of executing an instructions stream according to claim 7, wherein detecting each initialisation instruction comprises detecting after decryption.

* * * * *